United States Patent
Li et al.

(10) Patent No.: US 7,689,739 B2
(45) Date of Patent: Mar. 30, 2010

(54) SPREAD SPECTRUM RECEIVER, APPARATUS AND METHOD OF A CIRCULAR BUFFER FOR MULTIRATE DATA

(75) Inventors: Sung-Chiao Li, Taipei County (TW); Johnson Sebeni, Taipei County (TW); Eric Pan, Irvine, CA (US); Huoy Bing Lim, Fremont, CA (US)

(73) Assignee: Via Technologies, Inc., Taipei (TW)

( * ) Notice: Subject to any disclaimer, the term of this patent is extended or adjusted under 35 U.S.C. 154(b) by 488 days.

(21) Appl. No.: 11/456,229

(22) Filed: Jul. 10, 2006

(65) Prior Publication Data
US 2007/0022230 A1    Jan. 25, 2007

Related U.S. Application Data

(60) Provisional application No. 60/698,240, filed on Jul. 11, 2005.

(51) Int. Cl.
G06F 3/00 (2006.01)
H04B 1/00 (2006.01)

(52) U.S. Cl. .......................... 710/52; 710/56; 375/147; 375/148

(58) Field of Classification Search .................. 710/52, 710/56; 375/147, 148
See application file for complete search history.

(56) References Cited

U.S. PATENT DOCUMENTS

| | | | | |
|---|---|---|---|---|
| 5,729,571 A * | 3/1998 | Park et al. | .................... | 375/149 |
| 5,916,309 A * | 6/1999 | Brown et al. | .................... | 710/52 |
| 6,324,235 B1 * | 11/2001 | Savell et al. | ................. | 375/372 |
| 6,807,589 B2 * | 10/2004 | Apfeldorfer et al. | .......... | 710/52 |
| 6,934,826 B2 * | 8/2005 | Lubbers et al. | ............. | 711/170 |
| 7,088,764 B2 * | 8/2006 | Kaewell, Jr. | ................ | 375/140 |
| 7,187,708 B1 * | 3/2007 | Shiu et al. | .................... | 375/148 |

(Continued)

FOREIGN PATENT DOCUMENTS

EP    369920 A2 *    5/1990

(Continued)

OTHER PUBLICATIONS

English language translation of abstract of TW 507209 (published on Oct. 21, 2002).

(Continued)

Primary Examiner—Henry W. H. Tsai
Assistant Examiner—Steven G Snyder
(74) Attorney, Agent, or Firm—Thomas, Kayden, Horstemeyer & Risley (57) ABSTRACT

An apparatus, spread spectrum receiver, and method of controlling a circular buffer, comprising a circular buffer and a controller coupled thereto. The circular buffer receives first data at a first data rate and second data at a second data rate. The controller determines a first range in the circular buffer based on the first data rate and a first time difference between the first write and first read speed, accesses the first data in the first range, estimates a second range in the circular buffer based on the second data rate and a second time difference between the first write and first read speed, and accesses the second data in the second range, where the second range is larger than and partially covered by the first range.

8 Claims, 6 Drawing Sheets

U.S. PATENT DOCUMENTS

| | | | |
|---|---|---|---|
| 2001/0004379 A1* | 6/2001 | Wilson | 375/148 |
| 2002/0037027 A1* | 3/2002 | Medlock et al. | 375/147 |
| 2002/0141525 A1* | 10/2002 | Behrens et al. | 375/372 |
| 2004/0156325 A1* | 8/2004 | Perkins et al. | 370/299 |
| 2005/0262314 A1* | 11/2005 | Oh | 711/154 |
| 2005/0286521 A1* | 12/2005 | Chiang et al. | 370/389 |

FOREIGN PATENT DOCUMENTS

| | | |
|---|---|---|
| JP | 06089301 A * | 3/1994 |
| TW | 311222 | 7/1991 |
| TW | 507209 | 10/2002 |

OTHER PUBLICATIONS

English language translation of abstract of TW 311222 (published on Jul. 21, 1991).

\* cited by examiner

12 # SPREAD SPECTRUM RECEIVER, APPARATUS AND METHOD OF A CIRCULAR BUFFER FOR MULTIRATE DATA

CROSS-REFERENCE TO RELATED APPLICATION

The present application claims the benefit of U.S. provisional application Ser. No. 60/698,240, filed Jul. 11, 2005, the contents of which are incorporated herein by reference.

BACKGROUND OF THE INVENTION

1. Field of the Invention

The present invention relates to circular buffer, and in particular relates to a method and apparatus of a circular buffer for multi-rate data.

2. Description of the Related Art

Multi-rate data finds many applications in Digital Signal Process (DSP) systems, multimedia systems, computer systems, and telecommunication systems, in which data transmission at various data rates manages a wide variety of data types, formats, and rates. Temporary storage or buffers are commonly employed for multi-rate data, where precedent data are removed or overwritten upon processing of successive data.

While circular buffers have been deployed to buffer multi-rate data, optimization of buffer capacity remains a challenge. Third generation mobile telecommunications systems, such as Universal Mobile Telecommunications System (UMTS), require multi-rate data processing, wherein the data rate is adaptive with each frame.

U.S. Pat. No. 6,807,589 discloses a circular buffer for multi-rate data, employing four addresses indicating process status of previous data and calculating available buffer space by the four addresses, whereby successive buffer space can be allocated for successive data at a different data rate. However, the address maintenance and calculation increases circuitry complexity and manufacturing cost.

Therefore there is a need for a circular buffer with simple and efficient memory space allocation for data arriving at different data rates.

BRIEF SUMMARY OF THE INVENTION

A detailed description is given in the following embodiments with reference to the accompanying drawings.

According to one embodiment of the invention, an apparatus comprising a circular buffer and a controller coupled thereto is provided. The circular buffer receives first data at a first data rate and second data at a second data rate. The controller determines a first range in the circular buffer based on the first data rate, accesses the first data in the first range, estimates a second range in the circular buffer based on the second data rate, and accesses the second data in the second range, where the second range is larger than and partially covered by the first range.

According to another embodiment of the invention, a spread spectrum receiver comprises a early finger, a late finger, a matched filter, and a rake combiner comprising an adder, a circular buffer, and a controller. The early finger despreads first early data of the first data and second early data of the second data. The late finger despreads first late data of the first data and second late data of the second data. The matched filter is coupled to the first and late fingers, and allocates the first and second early data to the early finger, and the first and second late data to the late finger. The adder is coupled to the first and the late fingers, combines the first early data with the first late data as the first data, and the second early data with the second late data as the second data. The circular buffer is coupled to the adder and receives the first data and the second data. The controller is coupled to the circular buffer, determines a first range of the circular buffer based on first write speed of first data, accesses the first data in the first range, estimates a second range in the circular buffer based on second write speed of second data, and accesses the second data in the second range, wherein the second range is larger than and partially covered by the first range.

According to another aspect of the invention, a method of controlling a circular buffer comprises determining a first range in the circular buffer based on first write speed of first data, accessing the first data in the first range, determining a second range in the circular buffer based on second write speed of second data, and accessing the second data in the second range, wherein the second range is larger than and partially covered by the first range.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
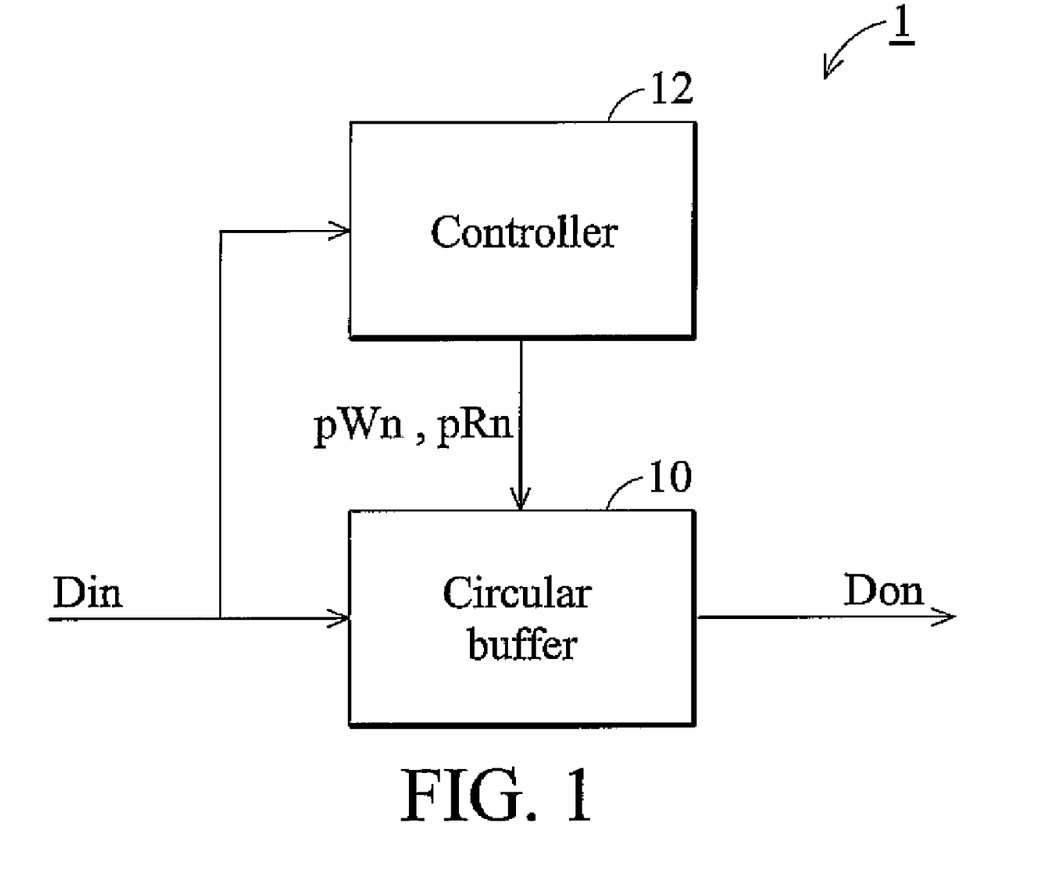
FIG. 1 is a block diagram of an exemplary apparatus of receiving multirate data in the invention.

FIG. 1 is a block diagram of an exemplary apparatus of receiving multi-rate data according to the invention, comprising a circular buffer 10 and a controller 12. Circular buffer 10 is coupled to controller 12.

Circular buffer 10 receives first data Di1 at a first data rate, then second data Di2 at a different second data rate. Controller 12 allocates the buffer space for two consecutive data rates, such that one is partially covered by the other, to meet minimal buffer space requirements of circular buffer 10. The allocated buffer space, or so called a range, could be determined by the Controller 12 according to data write speed, data read speed, the time elapse between the write and the read operations, and the time period of the whole operation. In one embodiment, the data write speed is supposed to be equal to or less than the data read speed. In one embodiment, the time period of the whole operation could be defined as a slot in CDMA system. In particular WCDMA standard, there are 15 slots in a fame of 10 ms, thus the time period of the whole operation is defined as 10/15 ms or 0.667 ms. In one embodiment, the time difference between the write and read operation could be determined as the expected maximum delay between the write and read operation. Ordinary in the skill shall understand the choices of these pre-determined parameters may be considered in various reasons including physical engineering limits. Controller 12 determines a first range in circular buffer 10 based on the first write speed, accesses the first data in the first range, estimates a second range in circular buffer 10 based on the second write speed, and accesses the second data in the second range. The second write speed exceeds the first speed, and more second data Di2 are expected than the first data Di1 in a given period, thus the second range is larger than the first one. Further, the second range is partially covered by the first to reduce minimal capacity requirement of circular buffer 10, which is determined by the maximal second range, subsequently by maximal write speed of the second write speed.

In one embodiment, the first time difference of the first write and read operation is equivalent to the second time difference of the second write and read operation. In particularly in WCDMA embodiments, the time difference is considered as the maximum delay between the earliest finger and the last finger due to the multi-path channel and the control delay of the WCDMA radio frequency network when receiving symbols from multiple base stations. For example, the time difference could be chosen as 1024 chips. For example, when the spreading factor is 256, the size of the sliding window of the range would be 1024/256 or 4 symbols. Moreover, the time difference is independent to the spreading factor in particular WCDMA embodiments. In one embodiment, the first write speed is equal to the first read speed, and the second write speed is equal to the second read speed.

In one embodiment controller 12 accesses first data by writing first data Di1 in first range, which is then read out prior to second data Di2 being accessed therein. Controller 12 accesses second data Di2 by writing then reading in second range. Since the second range partially encompasses the first range, controller 12 ensures the corresponding buffer space in first range becomes available only after the corresponding part of first data Di1 is read. Controller 12 controls the writing and reading operations to circular buffer 10 via a write pointer pWn and pRn respectively.

Figure 2A:
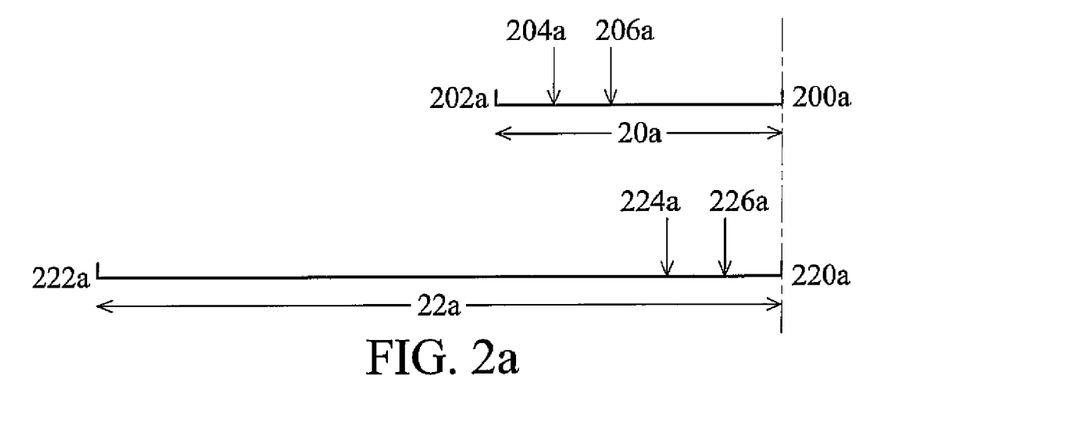
FIGS. 2a, b and c show exemplary memory allocation incorporated in the circular buffer in FIG. 1.

In an embodiment, first range comprises a first start address and a first end address, and second range comprises a second start address and a second end address. Controller 12 allocates first and second ranges such that first start address is substantially aligned with second start address. FIG. 2a shows an exemplary memory allocation incorporated in circular buffer 10 according to the invention, comprising first range 20a, second range 22a, first start address 200a, first end address 202a, first write address 204a, first read address 206a, second start address 220a, second end address 222a, second write address 224a, and second read address 226a.

Referring to FIG. 2a, first range 20a is less than second range 22a, first start address 200a is aligned with second start address 220a, and first end address 202a is less than second address 222a. First write address 204a moves from first start address 200a towards first end address 202a at first write speed as first data Di1 are written into first range 22a. First read address 206a follows first write address 204a at a first read speed equal to or lower than first write speed. Similarly, second write address 224a moves from second start address 220a towards second end address 222a at second write speed as second data Di1 are written into second range 22a. Second read address 226a follows second write address 224a at a second read speed equal or slower than second write speed.

When data received by circular buffer 10 are switched from first to second data rate, second write address 224a moves in second range 22a covered by first range 20a at a faster second write speed than first write speed, while first read address 206a still moves towards first end address 202a. Provided that first read address 206a reaches first end address 202a before second write address 224a, first data Di1 will not be overwritten by second data Di2. First write address 204a and second write address 224a may be implemented by Read/Write pointers or Write pointers, first read address 206a and second read address 226a by Read pointers.

Figure 2B:
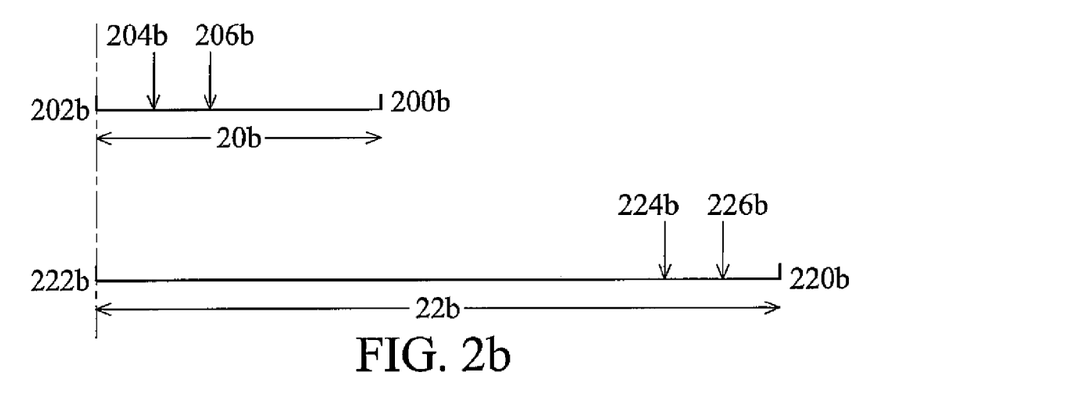

In another embodiment, first range comprises a first start address and a first end address, and second range comprises a second start address and a second end address. Controller 12 allocates first and second ranges such that first end address is substantially aligned with second end address. FIG. 2b shows exemplary memory allocation incorporated in circular buffer 10, comprising first range 20b, second range 22b, first start address 200b, first end address 202b, first write address 204b, first read address 206b, second start address 220b, second end address 222b, second write address 224b, and second read address 226b.

Referring to FIG. 2b, first range 20b is less than second range 22b, first end address 202b is aligned with second start address 222b, and first start address 200b is larger than second start 220b. First write address 204b moves from first start address 200b towards first end address 202b at first write speed as first data Di1 are written into first range 22b. First read address 206b follows first write address 204b at a first read speed equal to or lower than first write speed. Similarly, second write address 224b moves from second start address 220b towards second end address 222b at second write speed as second data Di1 are written into second range 22b. Second read address 226b follows second write address 224b at a second read speed equal to or lower than second write speed. When data received by circular buffer 10 are switched from second to first data rate, first write address 204b moves in first range 20b covered by second range 22b at the first write speed lower than second write speed, while second read address 226b still moves towards second end address 222b. Provided that second read address 226b reaches second end address 222b before first write address 204b, second data Di2 will not be overwritten by first data Di1. First write address 204b and second write address 224b may be implemented by Read/Write pointers or Write pointers, first read address 206b and second read address 226b by Read pointers.

Figure 2C:
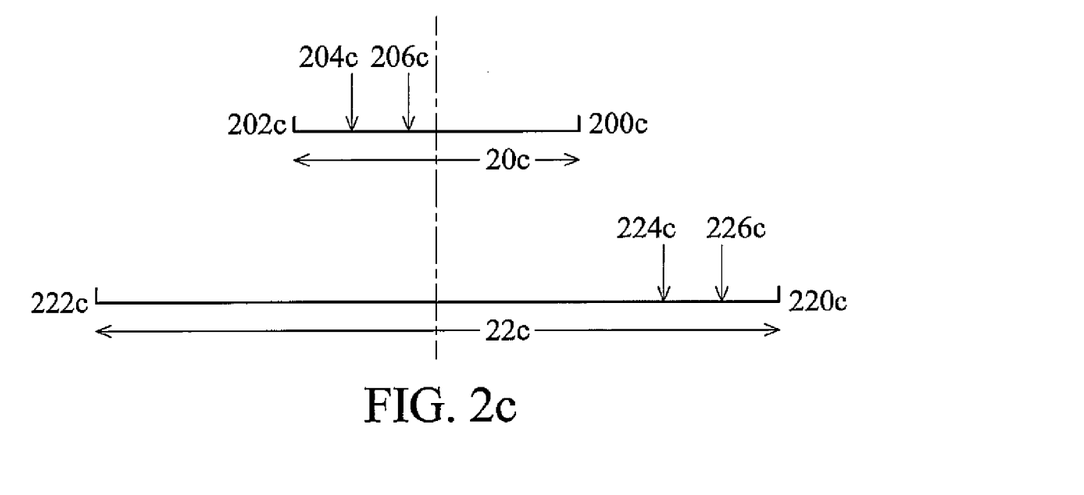

In another embodiment, first range comprises a first start address, a first center address, and a first end address, and second range comprises a second start address, a second center address, and a second end address. Controller 12 allocates first and second ranges such that first center address is substantially aligned with second center address. FIG. 2c shows exemplary memory allocation incorporated in circular buffer 10, comprising first range 20c, second range 22c, first start address 200c, first end address 202c, first write address 204c, first read address 206c, first center address 208c, second start address 220c, second end address 222c, second write address 224c, second read address 226c, and second center address 228c.

Referring to FIG. 2c, first range 20c is less than second range 22c, first center address 208c is aligned with second center address 228c, first start address 200c exceeds second start 220c, and first end address 202c is less than second end address 222c. First write address 204c moves from first start address 200c towards first end address 202c at first write speed as first data Di1 are written into first range 22c. First read address 206c follows first write address 204c at a first read speed equal to or lower than first write speed. Similarly, second write address 224c moves from second start address 220c towards second end address 222c at second write speed as second data Di1 are written into second range 22c. Second read address 226c follows second write address 224c at a second read speed equal to or lower than second write speed. When data received by circular buffer 10 are switched from first to second data rate, first write address 204c moves in first range 20c covered by second range 22c at faster second write speed than first write speed, while first read address 206c still moves towards first end address 202c. Provided that first read address 206c is close to first end address 202c, second write address 224c is at least one half of second range away therefrom, giving first read address 206c more time to first end address 202c before second write address 204c. Provided first data Di1 at first read address 206c is read before writing second data Di2 at second write address 224c, first data Di1 will not be overwritten by second data Di2. First write address 204c and second write address 224c may be implemented by Read/Write pointers or Write pointers, first read address 206c and second read address 226c by Read pointers.

Figure 3:
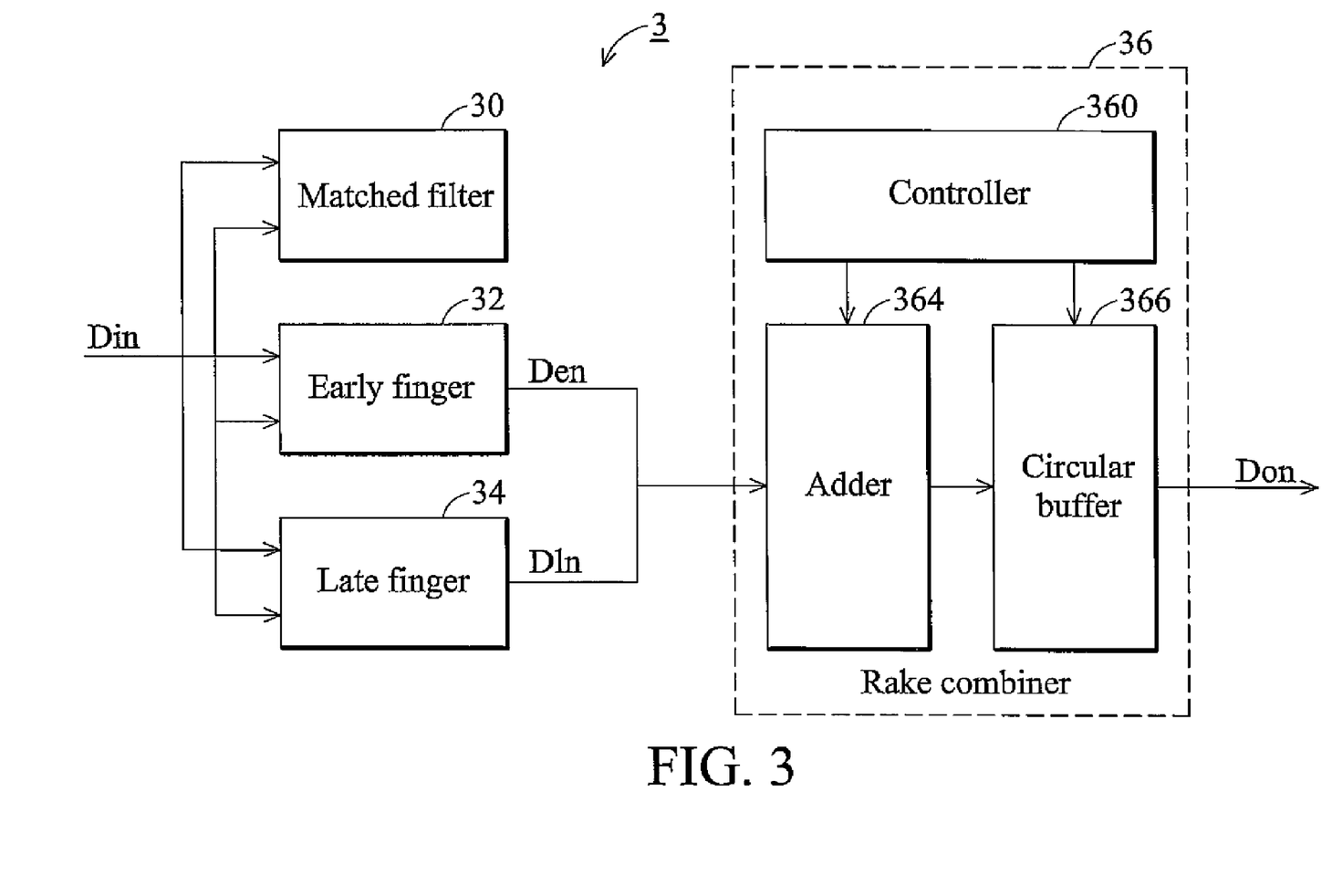
FIG. 3 is a block diagram of an exemplary rake receiver of receiving multirate data in a CDMA system according to the invention.

FIG. 3 is a block diagram of an exemplary rake receiver of receiving multirate data in a Code Division Multiple Access (CDMA) system according to the invention. The rake receiver may be incorporated into a CDMA receiver, data on different paths are received at an antenna, demodulated in an RF demodulator, combined together to form data stronger than the individual components in the rake receiver, which is then passed to a data demodulator. The individual paths are found by cross-correlating a spreading code with the received data. The spreading code is unique for each user in a CDMA system, each spreading sequence being orthogonal to others such that all users can share a common spectrum. The rate of a spreading code is referred to as chip rate. The number of chips per data is referred to as the spreading factor (SF).

$$SF = \text{chip rate}/\text{data rate} \qquad (EQ1)$$

A WCDMA system uses spreading factors 4-512 to spread the base band data over ~5 MHz band. In WCDMA system, a chip duration is about 0.26 microsecond. A data symbol with spreading factor of 256 is spread and de-spread with 256 chips. In one embodiment of this present invention, the time period t is defined as one slot. Moreover, in WCDMA system, there are fifteen slots in a frame endures 10 milli seconds. The time period t is equal to 10/15 or 0.667 us. Given the spreading factor is 4, the symbol rate is 4 chips/symbol*0.26 us/chip or 1.04 us/symbol or 960 symbol/ms. In this particular embodiment, since the time period is defined as one slot or 0.667 ms, the range could be determined as 0.667 ms*960 symbol/ms=640 symbols. The Table 1 shows relationship between the range size and the spreading factor in a given time period as one slot.

TABLE 1

| Spreading Factor | Buffer Size (in symbol) |
| --- | --- |
| 4 | 640 |
| 8 | 320 |
| 16 | 160 |
| 32 | 80 |
| 64 | 40 |
| 128 | 20 |
| 256 | 10 |

In another embodiment, the apparatus 1 is applied to a rake combiner of a rake receiver in a communication system, where first data Di1 comprises first early data De1 and first late data Dl1 due to multi-path, similarly second data Di2 also comprises second early data De2 and second late data Dl2. First early data De1 reach the rake combiner prior to the arrival of first late data Dl1, and second early data De2 prior to second late data Dl2. Apparatus 1 further comprises an adder coupled to circular buffer 10 and controller 12. Controller 12 writes first early data De1 into first range of circular buffer 10, then reads which to combine with first late data Dl1 as first data Di1 in the adder, and writes resultant first data Di1 back to first range. Likewise, controller 12 writes second early data De2 into second range, the adder combines which with second late data Dl2 as second data Di2, and writes the resultant second data Di2 back to second range. Since second range is covered partially by first range, first data Di1 has to be read out prior to second early data De2 being written thereto. First early data De1, first late data Dl1, first data Di1, second early data De2, second late data Dl2, and second data Di2 may be Code Division Multiple Access (CDMA) data and comprise in-phase (I) and quadrature (Q) components.

Referring to FIG. 3, rake receiver 3 comprises matched filter 30, early finger 32, late finger 34, and rake combiner 36. Matched filter 30 is coupled to early finger 32 and late finger 34, both coupled to rake combiner 36. Input data Din with multi-path components are executed through matched filter 30 to estimate multi-path delay and allocate a corresponding rake finger between early finger 32 and late finger 34. Early finger 32 despreads and descrambles early data Den for the $n^{th}$ data, and late finger 34 despreads and descrambles late data Dln for the $n^{th}$ data. Despite only early finger 32 and late finger 34 being shown here, additional rake fingers may be implemented in rake receiver 3 where appropriate. Early finger 32 and late finger 34 may compensate early data Den and late data Dln for phases and weights thereof, pass the compensated data to rake combiner 36, where the compensated data are combined to form single data Din. The early data Den and late data Dln may be compensated according to the maximum-ratio combining (MRC). Input data Din may be CDMA data and comprise in-phase (I) and quadrature (Q) components. In a CDMA system, rake receiver 3 may receive consecutive first and second data Di1 and Di2 at different data rate.

Rake combiner 36 comprises controller 360, adder 364, and circular buffer 366. Controller 360 is coupled to adder 364 and circular buffer 366, and adder 364 is coupled to circular buffer 366. Adder 364 receives and combines early data Den with late data Dln as the $n^{th}$ data Din to be stored in circular buffer 366, which receives first data Di1 at a first data rate and second data Di2 at a second data rate. Controller 360 determines a first range in circular buffer 360 based on first data rate, accesses first data in first range, estimates a second range in circular buffer 360 based on second data rate, and accesses second data in second range. Second data rate exceeds first data rate, and more second data Di2 are expected than first data Di1 in a given period, thus second range is larger than first range. Moreover, second range is partially covered by first one to reduce minimal capacity requirement of circular buffer 10, determined by the maximal second range, subsequently by maximal data rate of second data rate.

Upon execution rake receiver 3 in turn obtains first early data De1, first late data Dl1, second early data De2, and second late data Dl2. First early data De1 is compensated for the multi-path effect and written in first range of circular buffer 366, and read therefrom by controller 360 to combine with first late data Dl1 as first data Di1 in adder 364. Controller 360 then writes the resultant first data Di1 back to first range. Similarly, controller 360 writes the compensated second early data De2 to second range, adder 364 combines which with second late data Dl2 as second data Di2, and writes the resultant second data Di2 to second range. Since second range covers partially with first range, first data Di1 has to be read out prior to second early data De2 being written thereto.

While only two fingers are disclosed in FIG. 3, people in the art may modify rake receiver 3 to multiples fingers without deviating from the principle of the invention. Rake combiner 36 adds the data from corresponding fingers in adder 364 when the data arrives thereto, and stores the added data to circular buffer to produce output data Do after combining all data from all corresponding fingers.

Figure 4A:
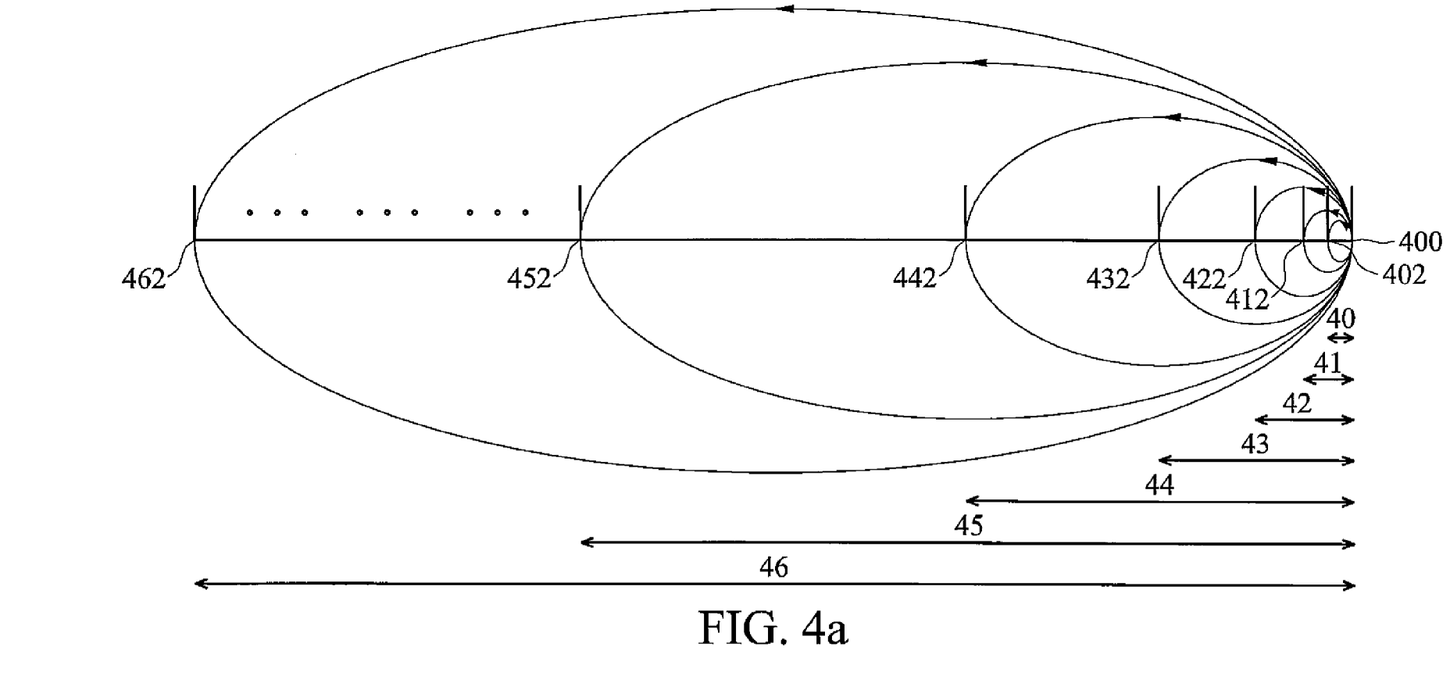
FIGS. 4a and b depict an exemplary memory allocation of the circular buffer in FIG. 3 according to the invention.

FIG. 4a depicts an exemplary memory allocation of the circular buffer in FIG. 3 according to the invention, comprising memory ranges 40 (SF=256), 41 (SF=128), 42 (SF=64), 43 (SF=32), 44 (SF=16), 45 (SF=8), and 46 (SF=4), and memory addresses 400, 402, 412, 422, 432, 442, 452, and 462, where addresses 400 and 402, 400 and 412, 400 and 422, 400 and 432, 400 and 442, 400 and 452, 400 and 462 are the start address and the end address for memory ranges 40, 41, 42, 43, 44, 45, and 46 respectively, with each start address aligned at address 400. Range 40 represents the slowest data rate and largest spreading factor (SF=256) and range 46 represents the fastest data rate and smallest spreading factor (SF=4).

Figure 4B:
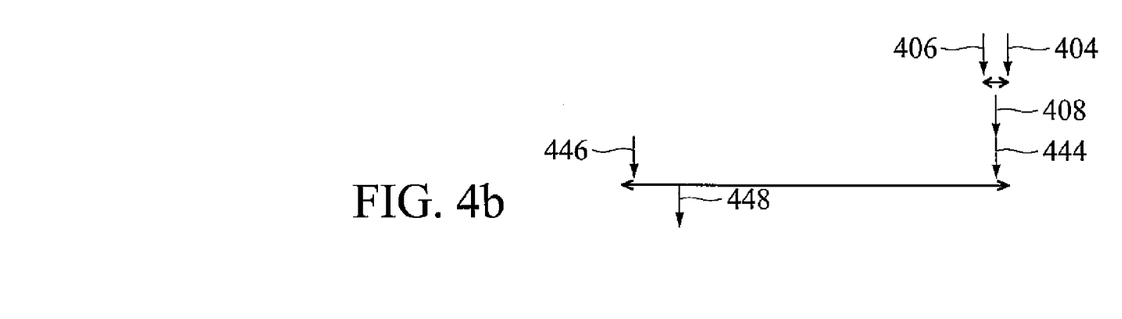

FIG. 4b shows an exemplary data access operation in the circular buffer of FIG. 3, incorporating the memory allocation in FIG. 4a, and comprising first ranges 40, second range 44, first and second start addresses 400, first end address 402, second end address 440, first early data address 404, first late data address 406, first read address 408, second early data address 444, second late data address 446, and second read address 448. When data received by circular buffer 366 are switched from first (SF=256) to second spreading factor (SF=16), second early data address 444 moves in second range 44 covered by first range 40 at a faster second data rate than the first data rate, with first read address 408 not having reached first end address 402 yet. Provided that first read address 408 reaches first end address 402 before second early data address 444, first data Di1 will not be overwritten by second data Di2. First early data address 404, first late data address 406, second early data address 444, and second late data address 446 may be implemented by Read/Write pointers, first read address 408 and second read address 448 by Read pointers.

Figure 5A:
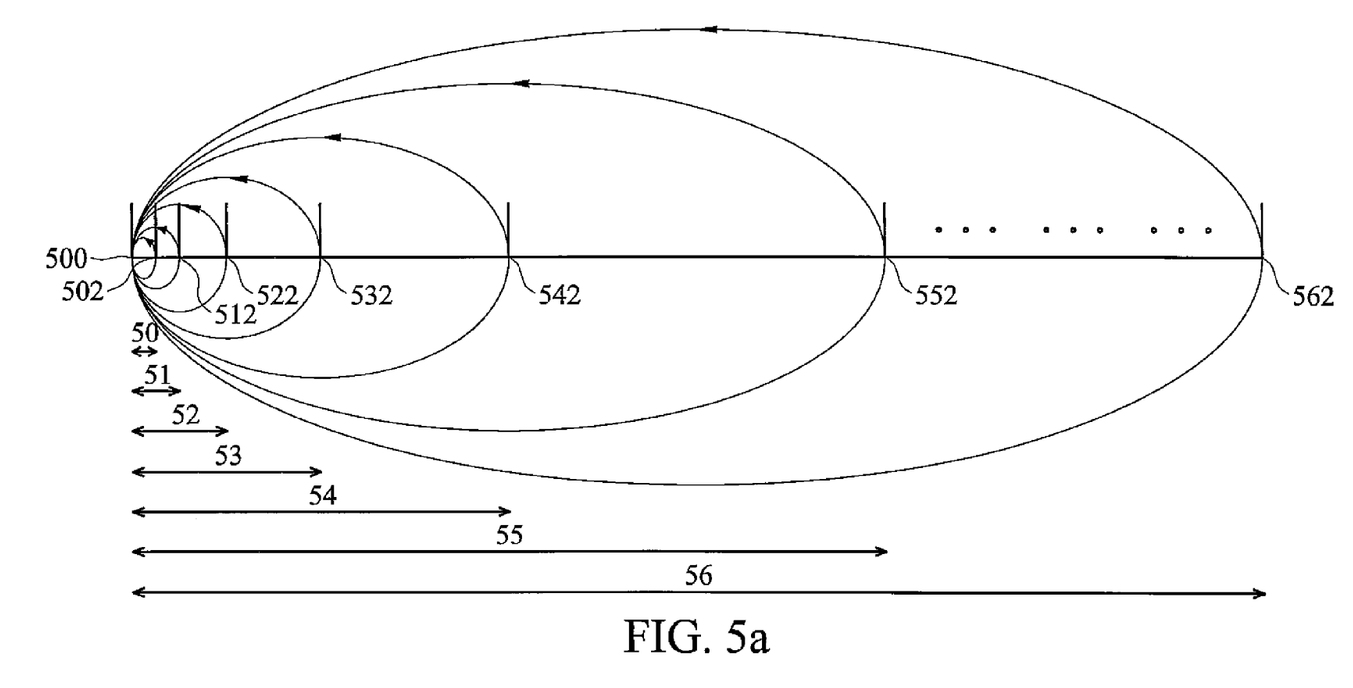
FIGS. 5a and b show another exemplary memory allocation of the circular buffer in FIG. 3 according to the invention.

FIG. 5a depicts an exemplary memory allocation of the circular buffer in FIG. 3 of the invention, comprising memory ranges 50 (SF=256), 51 (SF=128), 52 (SF=64), 53 (SF=32), 54 (SF=16), 55 (SF=8), and 56 (SF=4), and memory addresses 500, 502, 512, 522, 532, 542, 552, and 562, where addresses 502 and 500, 512 and 500, 522 and 500, 532 and 500, 542 and 500, 552 and 500, 562 and 500 are the start address and the end address for memory ranges 50, 51, 52, 53, 54, 55, and 56 respectively, each end address is aligned at address 500. Range 50 represents the slowest data rate and largest spreading factor (SF=256) and range 56 represents the fastest data rate and smallest spreading factor (SF=4).

Figure 5B:
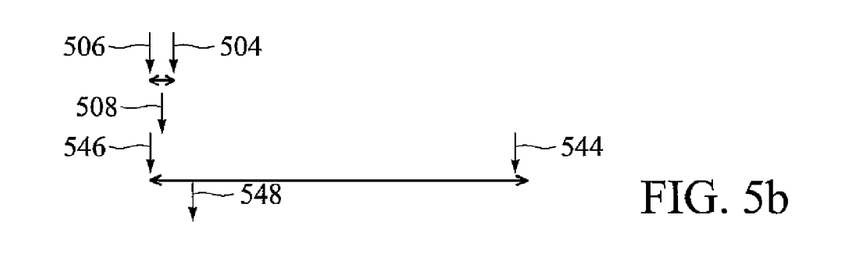

FIG. 5b shows an exemplary data access operation in the circular buffer of FIG. 3, incorporating the memory allocation in FIG. 5a, and comprising first ranges 54, second range 50, first and second end addresses 500, first start address 542, second start address 502, first early data address 544, first late data address 546, first read address 548, second early data address 504, second late data address 506, and second read address 508. When data received by circular buffer 366 are switched from first (SF=16) to second spreading factor (SF=256), second early data address 504 moves in second range 50 covered by first range 54 at a slower second data rate than the first data rate, while first read address 548 not having reached first end address 500 yet. Provided that first read address 548 reaches first end address 500 before second early data address 504, first data Di1 will not be overwritten by second data Di2. First early data address 544, first late data address 546, second early data address 504, and second late data address 506 may be implemented by Read/Write pointers, first read address 548 and second read address 508 by Read pointers.

Figure 6A:
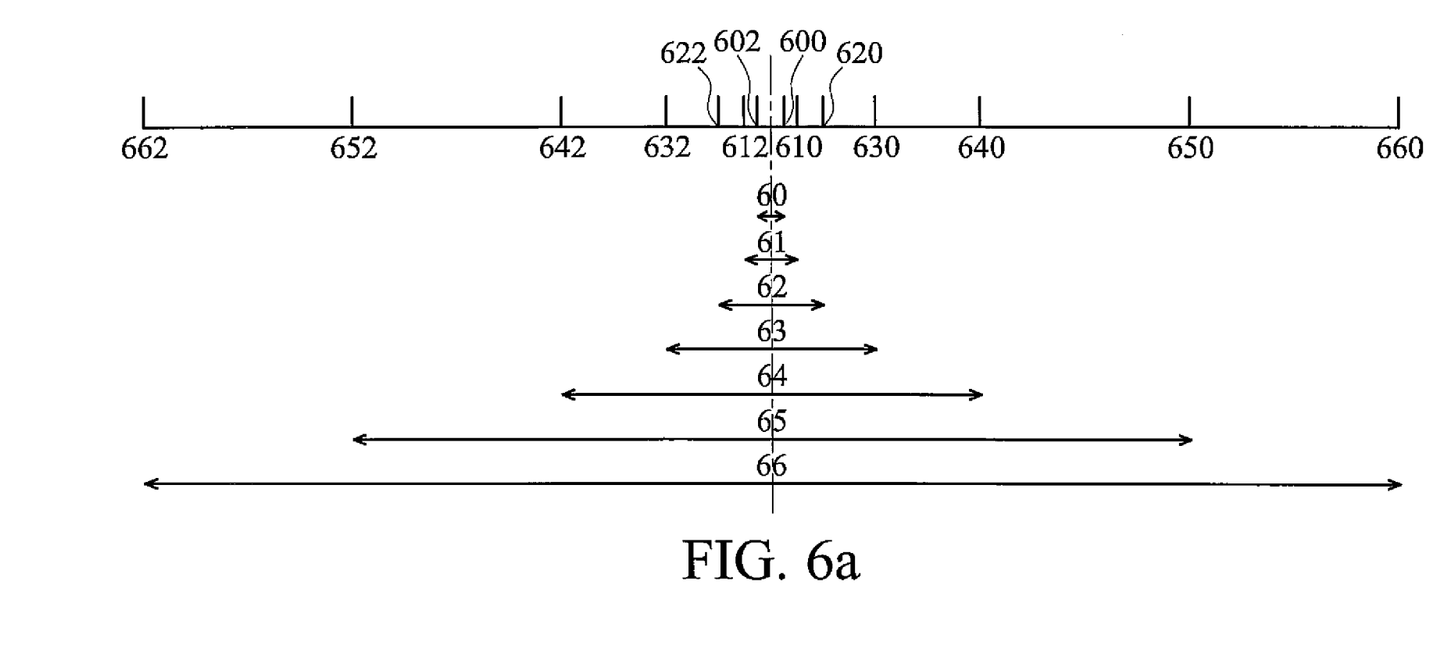
FIGS. 6a and b shows yet another exemplary memory allocation of the circular buffer in FIG. 3 according to the invention.

FIG. 6a depicts an exemplary memory allocation of the circular buffer in FIG. 3 of the invention, comprising memory ranges 60 (SF=256), 61 (SF=128), 62 (SF=64), 63 (SF=32), 64 (SF=16), 65 (SF=8), and 66 (SF=4), and memory addresses 600, 602, 610, 612, 620, 622, 630, 632, 640, 642, 650, 652, 660, 662, where addresses 600 and 602, 610 and 612, 620 and 612, 630 and 632, 640 and 642, 650 and 652, 660 and 662 are the start address and the end address for memory ranges 60, 61, 62, 63, 64, 65, and 66 respectively, with each center address aligned at address 670. Range 60 represents the slowest data rate and largest spreading factor (SF=256) and range 66 represents the fastest data rate and smallest spreading factor (SF=4).

Figure 6B:
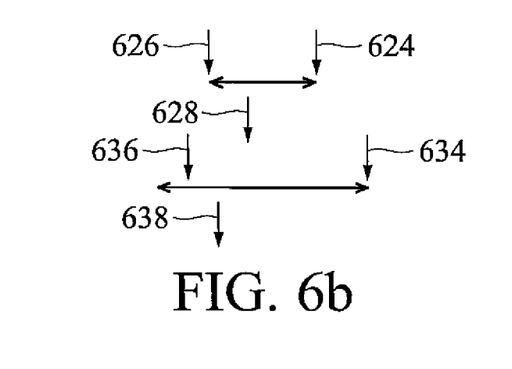

FIG. 6b shows an exemplary data access operation in the circular buffer of FIG. 3, incorporating the memory allocation in FIG. 6a, and comprising first ranges 62, second range 63, first start addresses 620, first end address 622, second start addresses 630, second end address 632, first early data address 624, first late data address 626, first read address 628, second early data address 634, second late data address 636, and second read address 638. When data received by circular buffer 366 are switched from first (SF=256) to second spreading factor (SF=16), second early data address 634 moves in second range 63 covered by first range 62 with a second data rate faster than the first data rate, while first read address 628 not having reached first end address 622 yet. Provided that first read address 628 is close to first end address 622, second early data address 634 is at least one half of second range away therefrom, giving first read address 628 more time to first end address 622 before second early data address 634, and first data Di1 is less likely to be overwritten by second data Di2. First early data address 624, first late data address 626, second early data address 634, and second late data address 636 may be implemented by Read/Write pointers, first read address 628 and second read address 638 by Read pointers.

In another embodiment of the invention, a method of controlling the apparatus in FIG. 1 is provided, comprising determining a first range in circular buffer 10 based on first write speed of first data Di1, accessing first data Di1 in the first range, determining a second range in circular buffer 10 based on second write speed of second data Di2, and accessing second data Di2 in the second range. The second write speed exceeds the first, and the second range is larger than the first range. Further, the second range is partially covered by the first range to reduce minimal capacity requirement of circular buffer 10, determined by the maximal second range, subsequently by maximal write speed of the second write speed.

In an embodiment, accessing first data Di1 comprises writing first data Di1 in the first range, and reading first data Di1 in the first range prior to second data Di2 are accessed therein, such that first data Di1 is not overwritten by second data Di2. The access to second data Di2 comprises writing second data Di2 in the second range; and reading second data Di2 in the second range.

In another embodiment to be incorporated in a rake combiner of a rake receiver, first early data De1, first late data Dl1, second early data De2, and second late data Dl2 are received by the rake combiner consecutively. The method further comprises writing then reading first early data De1 in the first range of circular buffer 10, combining which with first late data Dl1 as first data Di1 in the first range, writing then reading second early data De2 in the second range of circular buffer 10, and combining second early data De2 with second late data Dl2 as second data Di2 in the second range.

In one embodiment, we consider the start address alignment with an N chip lapse time between the first/second write operations and the first/second read operation. If the first speed is determined by a first spreading factor, SF1, the second speed is determined by a second spreading factor SF2, the delay of first read operation will be N/SF1 symbols between the write of a circular buffer address and the read from it. Upon initiation of second write operation with the second spreading factor SF2, the second write address starts at the beginning of the circular buffer, i.e., the same start address 0 of both the first range and the second range. Meanwhile the first read pointer will be at address 2560/SF1−N/SF1 with an assumption of 1 slot duration. Data will not be overwritten if the time in chips that it takes the second write operation to cover the first range is more than the time in chips that it takes the first read operation to get to the end of the first range. In other words, 2560/SF1*SF2>N/SF1*SF1 has to be hold. Thus a relationship SF2/SF1>N/2560 is derived from above description.

In one embodiment of WCDMA, depending on the maximal delay between the early finger data and the latest finger data, N shall be chosen lower bound.

In a variant of the embodiment mentioned above, we consider the end address alignment situation with the same assumption of SF1, SF2, and N. The first read pointer will be at address 640−N/SF1 when the second write starts at the start address of the second range, which is given by 640−2560/SF2 for the second data rate period. Data will not be overwritten if the time in chips that it takes the second write operation to start from the variable start address and cover the first write range is more than the time in chips that it takes the first read operation to get to the end of the first range. Also that the variable start address is smaller than the first read pointer address. In other words, two conditions 2560/SF2*SF2>N/SF1*SF1 and 640-2560/SF2<640−N/SF1 have to be hold. Thus SF1/SF2>N/2560 and 2560>N could be derived from above description.

A further variant embodiment for center address alignment situation, the data will not be overwritten if the following relationships hold: (SF1+SF2)/SF1>N/1280 where SF2<SF1. It also shows the data will not be overwritten for the speed decrease change by noting that slower speed write operation will have to completely write one half buffer in 1280 chips during which the first read operation will trying to get to the end of the first range. With the choice of N<1280, the first write operation will get to the end by this time. Thus with center alignment in this embodiment, all speed changes can be used for various first/second data rate.

While parts of the disclosure are incorporated into a CDMA system, the circuitry and method disclosed may also find applications in other systems, and those skilled in the art may make modifications where appropriate based on the principle of the invention.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A spread spectrum receiver for receiving a first data at a first data rate and a second data at a second data rate in a pre-determined time period, the spread spectrum receiver comprising:
    an early finger for de-spreading a first early data of the first data and a second early data of the second data;
    a late finger for de-spreading a first late data of the first data and a second late data of the second data;
    a matched filter, coupled to the early and late fingers, is configured to allocating the first and second early data to the early finger and allocating the first and second late data to the late finger;
    a rake combiner, coupled to the first and the late fingers, comprising:
        an adder, coupled to the first and the late fingers, is configured to combining the first early data with the first late data as the first data and the second early data with the second late data as the second data;
        a circular buffer, coupled to the adder, is configured to receiving the first data and the second data;
        a controller, coupled to the circular buffer, is configured to determining a first range of the circular buffer based on first write speed of first data and a first time difference between the first write and a first read speed, accessing the first data in the first range, determining a second range in the circular buffer based on second write speed of second data and a second time difference between the second write and a second read speed, and accessing the second data in the second range; and
    wherein the second range is larger than and partially covered by the first range.

2. The spread spectrum receiver of claim 1, wherein the controller accesses the first data by writing the first data in the first range, and reading the first data in the first range prior to the second data is accessed therein, the controller accesses the second data by writing the second data in the second range, and reading the second data in the second range.

3. The spread spectrum receiver of claim 1, wherein the rake combiner further comprises a phase shifter coupled to the early finger unit, the late finger unit and the adder, compensating phase shift of the first early data, the first late data, the second early data, and the second late data.

4. The spread spectrum receiver of claim 1, wherein the first range comprises a first start address and a first end address, the second range comprises a second start address and a second end address, and the alignment of the first and second ranges being selected from a group of:
    the first start address is substantially aligned with the second start address;
    the first end address is substantially aligned with the second end address; and
    the first range is substantially aligned with the second range by centers thereof.

5. The spread spectrum receiver of claim 1, wherein the first and the second data are CDMA data, and the first and the second data rate are determined by first and second spreading factors of the first and the second data respectively.

6. The spread spectrum receiver of claim 1, wherein the second write speed exceeds the first write speed.

7. The spread spectrum receiver of claim 1, wherein capacity of the circular buffer is determined by maximal write speed of the second write speed.

8. The method of claim 4, wherein the first write speed is determined by a first spreading factor SF1, the second write speed is determined by a second spreading factor SF2, the first and second time differences are N chips, and a slot duration is the predetermined time period, the relationships between the first spreading factor SF1, the second spreading factor SF2, and the first/second lapse time N are selected from a group of:

SF2/SF1>N/2560, if the first start address is substantially aligned with the second start address;

SF1/SF2>N/2560 and 2560>N, if the first end address is substantially aligned with the second end address; and (SF1+SF2)/SF1>N/1280 where SF2<SF1, if the first range is substantially aligned with the second range by centers thereof.

* * * * *